May 4, 1965
A. ANDERSEN, JR
3,181,740
CROP DRYERS
Filed May 9, 1962
3 Sheets-Sheet 1
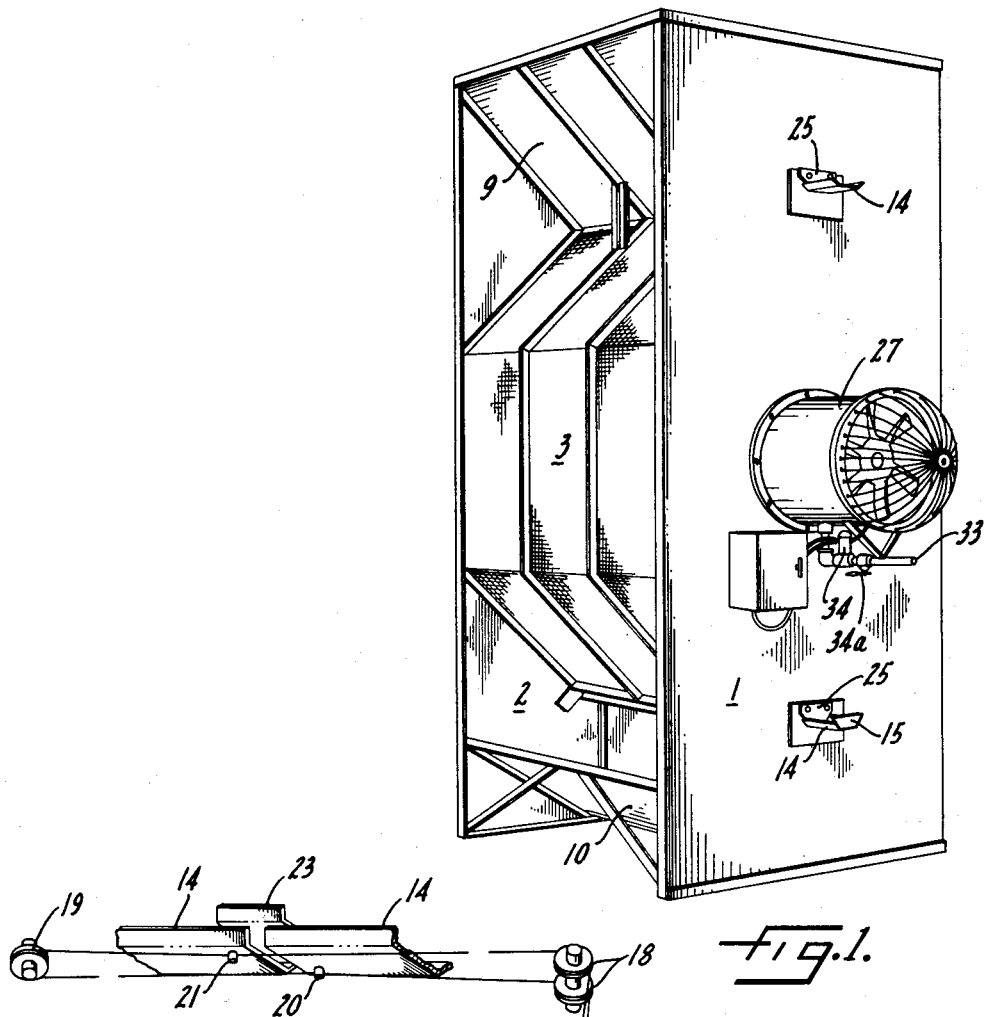
Fig. 1.
Fig. 5.
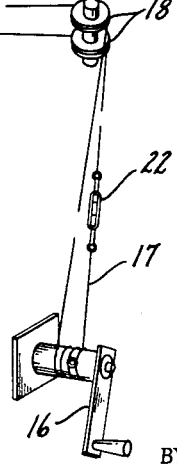
INVENTOR.
Arthur Andersen, Jr.
BY Parker & Carter
Attorneys.

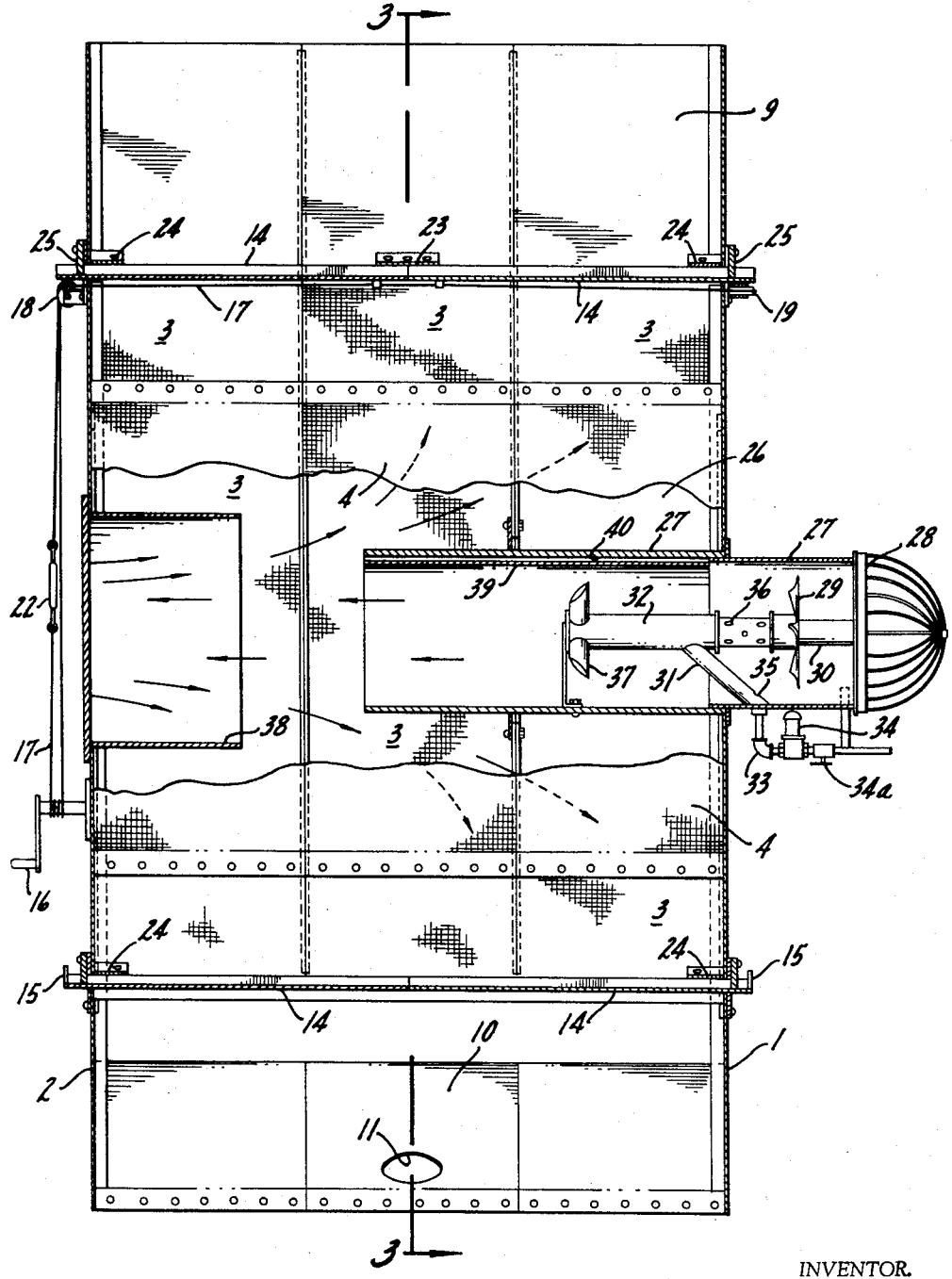

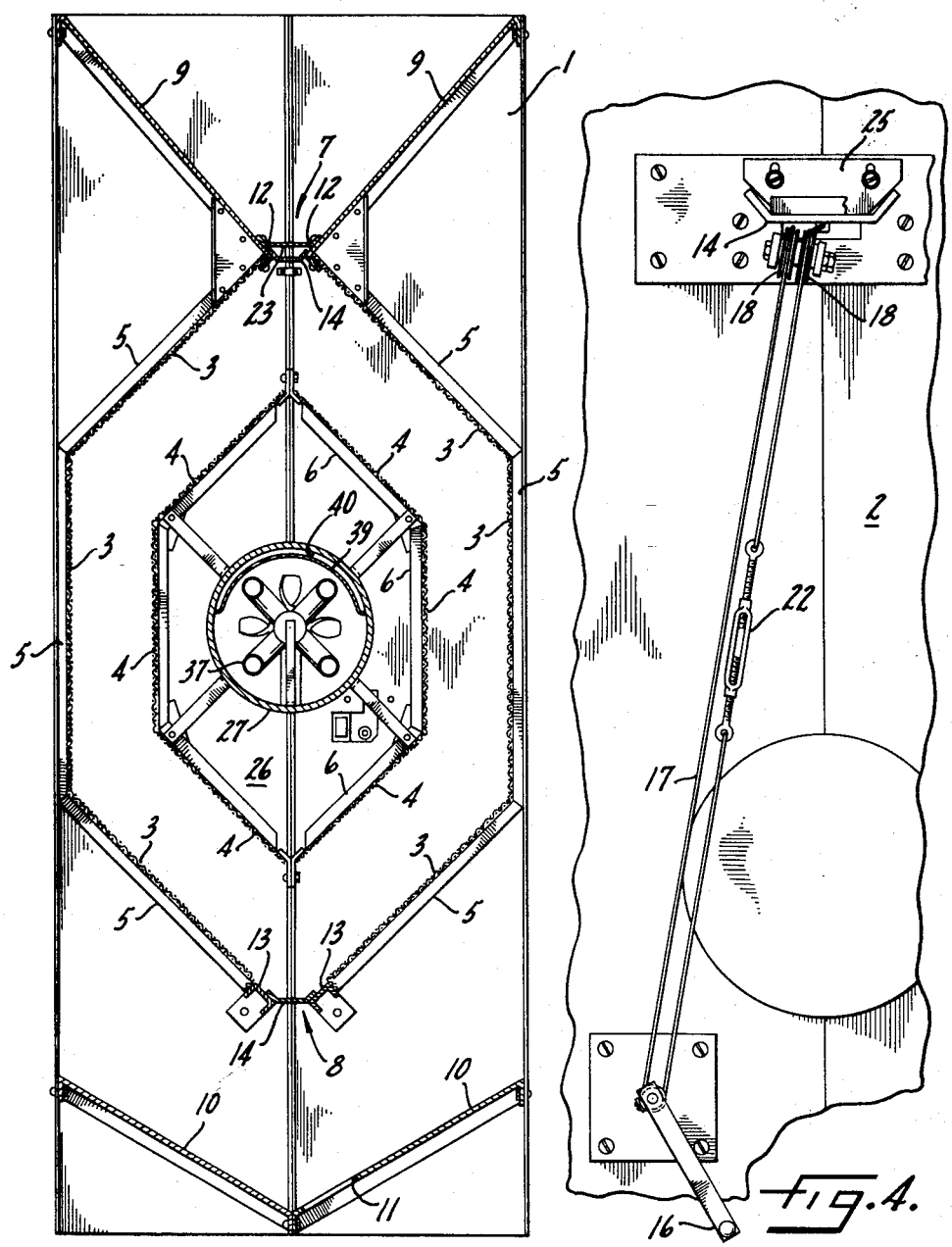

United States Patent Office 3,181,740
Patented May 4, 1965

3,181,740
CROP DRYERS
Arthur Andersen, Jr., Fort Myers, Fla., assignor to American Farm Equipment Co., Crystal Lake, Ill., a corporation of Illinois
Filed May 9, 1962, Ser. No. 193,394
1 Claim. (Cl. 222—503)

My invention relates to improvements in crop dryers and has for one object to provide an inexpensive crop dryer which can be knocked down for shipment and be easily assembled by the farmer who buys it.

Another object is to provide a burner for a crop dryer which will be especially effective.

Another object is to provide manually operated means for charging and discharging the dryer without damage to the granular contents thereof.

Other objects will appear from time to time throughout the specification and claim.

My invention is illustrated diagrammatically in the accompanying drawings, wherein:

FIGURE 1 is a perspective view of the burner side of the dryer;

FIGURE 2 is a vertical axial cross section through the dryer and the burner showing parts in elevation;

FIGURE 3 is a section along the line 3—3 of FIGURE 2;

FIGURE 4 is a detail end elevation of a part of the dryer seen from the side opposite FIGURE 1;

FIGURE 5 is a diagram of the gate operating mechanism.

Like parts are indicated by like characters throughout the specification and drawings.

The dryer includes a vertical burner supporting end wall 1 and a vertical gate control supporting end wall 2 parallel therewith. These walls are joined by a foraminous outer basket wall 3 and an inner basket wall 4. These two basket walls are bent intermediate their ends as shown to define generally parallel hexagonal inner and outer walls for a grain drying chamber of generally uniform radial dimension. They are reinforced between the end walls as indicated by angle bars 5 and 6 which project respectively inwardly and outwardly from the basket walls so that the inner surfaces bounding the drying chamber are smooth and uninterrupted. The inner basket walls 4 are continuous. The outer basket walls 3 are interrupted at top and bottom to define a wet grain feed port 7 and a dry grain discharge port 8.

Mounted between the walls 1 and 2 above the drying chamber is a wet grain feed hopper 9, the discharge port of which coincides with the wet grain feed port 7. Below the drying chamber, supported between the walls 1 and 2 is a dry grain receiving hopper 10 which may be closed at bottom so that dry grain may be shoveled out of it or may be ported as at 11 for discharge to any suitable handling or disposal means.

The wet grain feed port 7 is bounded on opposite sides by tracks 12. The dried grain discharge port 8 is bounded by tracks 13. These tracks extend horizontally across the space between the walls 1 and 2 and are transversely inclined in general continuation respectively of the walls of the feed hopper 9 and the bottom wall 3 of the drying chamber. These tracks support horizontal sliding channel shaped gates 14, two associated with each of the ports and flanged to engage and slide along the tracks. The lower gates terminate in handles 15 and because they are near the ground the operator opens and closes the gates by hand. The upper gates being far above the ground are mechanically actuated by crank 16, endless cable 17 which travels over pulleys 18 and 19, anchored on pins 20, 21. The cable may be adjusted in tension by the turn buckle 22 and when the crank is rotated in one direction, it moves the two gates apart and when in the opposite direction it draws them together. The cables and pins being on the underside of the gates do not in any way interfere with the flow of grain from the feed bin.

Extending across the ports 7 and 8 above the tracks 12 and 13 respectively are shields 23 located centrally of the longitudinal extension of the tracks and spaced above them so as not to contact the gates. At each end of each of the ports 7 and 8 are similar end shields 24. The vertical clearance between the shields 23 and 24 and the gates is greater than the intended maximum size of the grain or particles to be dried and the width of these shields is such that the angle of repose as the gates finally close prevents escape whether the gates actually come together or not and the angle of repose beneath the shields is such that grains will not run out under flow pressure, and also grain is not cut or crushed by the gates.

Loosely supported on the outside of the walls 1 and 2, fitting into the gates 14 are scrapers 25 which ride along the gates as they open and close and add additional assurance that grain will not escape.

Inside the plenum chamber 26 defined by the foraminous inner basket wall 4 is a tubular furnace 27 which extends inwardly through the wall 1 to terminate at an intermediate point. The tubular furnace at its outer end carries a motor housing 28 which contains a motor which drives a fan 29 by a shaft 30 for discharge of air through the furnace into the plenum chamber. Inside the furnace 27 is a burner assembly which includes an inclined burner tube 31 discharging into a horizontal after burner tube 32. The burner tube 31 contains suitable fuel nozzle and ignition means not shown in detail as they form no part of the present invention, fed by the gas or oil pipe 33 responsive to control 34 and hand valve 34a. After ignition the flame starts burning in the tube 31 with after burning in the tube 32. Initial air comes in through the prime air port 35, and for after burning comes in through the after burner ports 36 and the products of combustion pass out through the radial tubes 37 to be mixed with an additional supply of air entering through the furnace tube 27. The resultant hot air mixed with products of combustion discharges into the open ended cylindrical baffle 38 and the hot air mixed with products of combustion returns back into the plenum chamber for passage outwardly through the inner basket wall 4 through the grain in the basket between the inner and outer basket walls and then to atmosphere through the outer basket wall 3. A shield 39 is located above the burner in the upper portion of the furnace 27 to provide a dead air space 40 so that the direct heat from the furnace will not be transmitted by radiation to the grain.

It is important that only hot air mixed with non-luminous completely burnt products of combustion enter the plenum chamber, otherwise the grain may be charred.

The use and operation of the invention are as follows:

The furnace with its assembly and the baffle 38 are shipped in assembled condition. The plates making up the dryer are shipped flat, cut to length. The farmer bends the foraminous plates to make the inner and outer bin or basket walls, bolts them, the end plates and the reinforcing angles together and builds up the entire assembly.

Having done this, he is ready to start operation. He loads his wet grain into the bin 9, turns the crank to open the upper slide gates 14 and allows the wet grain to fill the basket. The lower slide gates are meanwhile closed. He then throws the usual switch, not illustrated, to start the motor and turns on the gas or oil, ignites it with a torch or by electric means as the case may be and as the fuel burns in the furnace, hot products of combustion mix with the air, blasting into the plenum chamber. Final mixing takes place in the cylindrical baffle drum and the mixed hot products of combustion now diluted and cool enough so that they will not burn the grain, pass out through the basket containing the grain and through the grain. This continues until grain has been dried to the desired degree. Under some circumstances the operator may add a little more wet grain to compensate for shrinkage if he so desires but at any rate when the basket is full and the upper and lower gates are closed, all the hot drying gas must pass out through the grain and thus accomplish a very effective drying.

When sufficient drying has been accomplished, the operator pulls the lower gates back by hand and spills the dried grain into the bin 10 for whatever disposal he desires. When the basket is empty, the apparatus is ready for another cycle of operation.

I claim:

Downwardly and inwardly tapered bin walls defining a downwardly tapered bin which terminates in a horizontally disposed discharge port, two parallel generally horizontal spaced tracks on opposite sides of the port, two opposed slide gates mounted for movement toward and from one another along said tracks, the tracks and the gates extending outwardly beyond the bin at both ends of the port, the gates being of such length that when their inner ends are in port closing contact adjacent the center of the port, their outer ends are masked by the bin walls, a fixed shield intermediate the ends of the port, overlying and out of contact with the gates and masking the area where they come into port closing contact with one another, the movement of the gates toward and from one another defining variable discharge apertures beyond both ends of the shield, the vertical clearance between the shield and the gates being greater than the maximum size of the particles to be discharged through the port, the shield extending in both directions along the port from the area of contact of the gates a distance such that the angle of repose of the grain limits grain movement under bin pressure between the gate and the shield to an area short of the point of closing contact of the gates.

References Cited by the Examiner
UNITED STATES PATENTS

| | | | |
|---|---|---|---|
| 921,395 | 5/09 | Hager | 34—174 |
| 1,711,574 | 5/29 | Miller | 34—174 X |
| 1,792,064 | 2/31 | Berrigan et al. | 263—29 X |
| 2,278,730 | 4/42 | Neuman | 198—56 |
| 2,466,923 | 4/49 | Woodard | 214—83.18 |
| 2,490,439 | 12/49 | Hughes | 222—50 X |
| 2,499,792 | 3/50 | Starr | 214—83.18 |
| 2,883,076 | 4/59 | Palmer. | |
| 2,991,061 | 7/61 | Boron | 263—30 |
| 3,025,143 | 3/62 | Huff | 263—30 |

HUGO O. SCHULZ, *Primary Examiner.*

PERCY L. PATRICK, ERNEST A. FALLER, Jr.,
*Examiners.*